(12) United States Patent
Kangas et al.

(10) Patent No.: US 9,070,026 B2
(45) Date of Patent: Jun. 30, 2015

(54) COORDINATION OF TRANSMISSION OF DATA FROM WIRELESS IDENTIFICATION TAGS

(75) Inventors: P. Daniel Kangas, Raleigh, NC (US); Jeff D. Thomas, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 621 days.

(21) Appl. No.: 13/284,883

(22) Filed: Oct. 29, 2011

(65) Prior Publication Data

US 2013/0106582 A1    May 2, 2013

(51) Int. Cl.
*H04Q 5/22*  (2006.01)
*G06K 7/01*  (2006.01)

(52) U.S. Cl.
CPC ........................................ *G06K 7/01* (2013.01)

(58) Field of Classification Search
CPC .......... G06K 7/0008; G06K 19/07749; G06K 19/0723; G06Q 10/087; G06Q 10/08; G06Q 10/0833
USPC ............ 340/10.1–10.6, 572.1–572.9, 539.11, 340/539.13; 235/375, 376, 377, 383–386
See application file for complete search history.

(56) References Cited

U.S. PATENT DOCUMENTS

| | | | |
|---|---|---|---|
| 5,216,419 A * | 6/1993 | Fujisaka et al. | ............ 340/10.52 |
| 5,591,951 A | 1/1997 | Doty | |
| 6,377,203 B1 | 4/2002 | Doany | |
| 7,808,388 B2 | 10/2010 | Kangas | |
| 7,852,221 B2 | 12/2010 | Tuttle | |
| 2002/0175805 A9 | 11/2002 | Armstrong et al. | |
| 2003/0169149 A1 | 9/2003 | Ohki et al. | |
| 2004/0012486 A1 | 1/2004 | Mani | |
| 2005/0088284 A1 | 4/2005 | Zai et al. | |
| 2005/0237159 A1 | 10/2005 | Cooper et al. | |
| 2005/0253725 A1 | 11/2005 | Neuwirth et al. | |
| 2006/0006986 A1 | 1/2006 | Gravelle et al. | |
| 2006/0012465 A1 | 1/2006 | Lee et al. | |
| 2006/0022800 A1 | 2/2006 | Krishna et al. | |
| 2007/0001813 A1 | 1/2007 | Maguire et al. | |
| 2009/0091451 A1 | 4/2009 | Jones et al. | |
| 2010/0194545 A1 | 8/2010 | Wong | |

OTHER PUBLICATIONS

Applicant's Reply dated Jan. 29, 2013 to GB Search and Examination Report under (EPC) Sections 17 and 18(3), mailed Jan. 11, 2013, for corresponding GB patent application No. GB 1216248.3.

(Continued)

*Primary Examiner* — Brian Zimmerman
*Assistant Examiner* — Laura Nguyen
(74) *Attorney, Agent, or Firm* — Olive Law Group, PLLC

(57) ABSTRACT

Methods and systems for coordinating transmission of data from wireless identification tags are disclosed. According to an aspect, a wireless identification tag includes a communication module configured to wirelessly transmit data in response to receipt of an instruction. The wireless identification tag also includes a timer configured to communicate the instruction to the communication module for transmission of the data within a timeslot based on a stored first identifier of the wireless identification tag. Further, the timer module is configured to receive second identifier. The timer module is also configured to change the first identifier based on the second identifier.

17 Claims, 12 Drawing Sheets

(56) References Cited

OTHER PUBLICATIONS

Non-Final Office Action mailed Jun. 3, 2013, for related U.S. Appl. No. 13/284,888.
Applicant's Response filed Jul. 23, 2013, to the NFOA mailed Jun. 3, 2013 for related U.S. Appl. No. 13/284,888.
GB Search and Examination Report under (EPC) Sections 17 and 18(3), mailed Jan. 11, 2013, for related GB patent application No. GB 1216248.3.
G. Binetti et al., A Hashing-Based Anti-Collision Algorithm for RFID Tag Identification, IEEE ISWCS, Dipartimento di Elettrotecnica ed Elettronica, 2007, pp. 524-528, Bari, Italy.
Shih, Tzay-Farn et al., An Efficient Anti-Collision Algorithm for RFID System, Thesis for the Degree of Master, Department and Graduate Institute of Computer Science and Information Engineering Chaoyang University of Technology, 8th WSEAS International Conference on Applied Computer and Applied Computational Science, Aug. 2009.

\* cited by examiner

# COORDINATION OF TRANSMISSION OF DATA FROM WIRELESS IDENTIFICATION TAGS

CROSS-REFERENCE TO RELATED APPLICATIONS

This application is related to co-pending U.S. utility patent application Ser. No. 13/284,885, filed simultaneously herewith and titled "CONTROL OF WIRELESS IDENTIFICATION TAG ACTIVATION," and U.S. utility patent application Ser. No. 13/284,888, filed simultaneously herewith and titled "IDENTIFIER SEQUENCING OF WIRELESS IDENTIFICATION TAGS," all of which are hereby incorporated herein by reference in their entireties.

BACKGROUND

1. Field of the Invention

The present invention relates to wireless identification tags, and more specifically, to systems and methods for coordinating data transmission from wireless identification tags.

2. Description of Related Art

Wireless identification tag technology utilizes wireless communication techniques to transfer data from a wireless identification tag, such as a radio frequency identification (RFID) tag or transponder, to a wireless identification reader. In an example, applications of RFID technology include affixing an RFID tag to an object for identifying and tracking the object. Additional example applications for RFID technology include tracking inventory, store items, assets, people, and the like. For example, an RFID tag may be affixed to food items, cars, computer equipment, books, and mobile phones.

In retail environments, such as grocery stores, RFID tags may be affixed to items for identifying the items during checkout and for tracking movement of the items throughout the store. One or more RFID read cells may be placed in the store for wirelessly signaling RFID tags within its communication range to activate. One difficulty can occur when an RFID read cell simultaneously activates multiple RFID tags. In this scenario, the RFID tags will simultaneously transmit their data to the RFID read cell. Such simultaneous transmission by the RFID tags can result in signaling collisions. Current collision avoidance techniques include halting data transmission and subsequently waiting for a random time period before again attempting to transmit data from an RFID tag. However, collisions may continue to occur later when two or more of the RFID tags transmit simultaneously. Further, as the number of RFID tags increase, the time needed to read data from all the RFID tags increases. In view of these difficulties, there is a need for improved RFID tag management systems and techniques.

BRIEF SUMMARY

In accordance with one or more embodiments of the present invention, methods and systems disclosed herein coordinate transmission of data from wireless identification tags. According to an aspect, a wireless identification tag includes a communication module configured to wirelessly transmit data in response to receipt of an instruction. The wireless identification tag also includes a timer configured to communicate the instruction to the communication module for transmission of the data within a timeslot based on a stored first identifier of the wireless identification tag. Further, the timer module is configured to receive a second identifier. The timer module is also configured to change the first identifier based on the second identifier.

DETAILED DESCRIPTION

Figure 1:
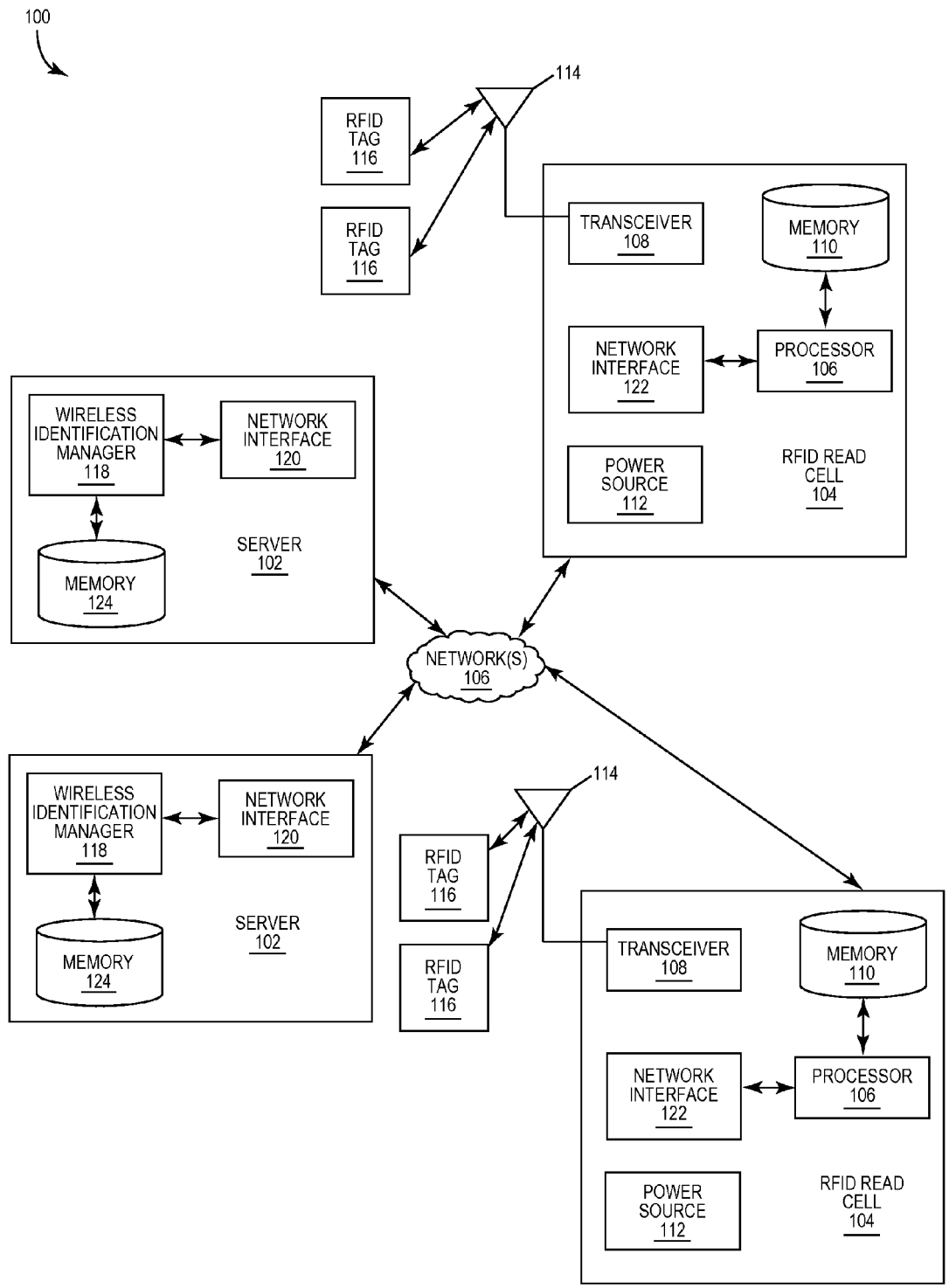
FIG. 1 is a block diagram of an example wireless identification system capable of managing multiple wireless identification tags in accordance with embodiments of the present invention.

Exemplary systems and methods for coordinating data transmission from wireless identification tags in accordance with embodiments of the present invention are disclosed herein. Particularly, described herein is a wireless identification tag including a communication module configured to wirelessly transmit data in response to receipt of an instruction. For example, an RFID tag may receive an activation signal from an RFID read cell. The RFID read cell may send the activation signal to the RFID tag when the RFID tag is within range of the RFID read cell. The wireless identification tag may also include a timer module configured to communicate the data to the communication module for transmission of the data. The data is transmitted within a timeslot based on a stored identifier of the wireless identification tag. For example, a timeslot for transmission of the data may be defined based on all or a portion of a currently-stored identifier of the wireless identification tag. The identifier may be unique among one or more other RFID tags managed by one or more RFID read cells such that the timeslot defined for the RFID tag is different than timeslots for the other RFID tags. The timer module may also be configured to receive another identifier, and to change the currently-stored identifier based on the received identifier. In this way, an identifier of the wireless identification tag and the timeslot for transmission of data from the wireless identification tag may be changed such that transmission of data from the RFID tags occurs at different times.

Tag identifiers may be re-sequenced at different times for enabling high performance read times. By ordering timeslots for transmission of data from tags, enhanced control features may be enabled. For example, an item having a tag attached thereto may be quickly and correctly relocated to its proper location, such as a store shelf or aisle. In another example, items within a store may be quickly inventoried by reading tag data.

Example applications of embodiments of the present invention include retail environments, such as grocery stores and book stores. Another example application includes a warehouse environment. More generally, embodiments of the present invention may be applied to any environment in which items require tracking Wireless identification tags as described herein may be attached to such items, and one or more wireless identification read cells or readers may be positioned within the environment to activate the tags for reading identifiers and/or other supplemental data stored within the tags.

As referred to herein, the term "wireless identification tag" refers broadly to any electronic device capable of communicating data stored therein in response to signaling by a wireless identification read cell or reader. An example of a wireless identification tag is an RFID tag. An RFID tag may include radio frequency (RF) circuitry and memory or any suitable hardware, software, and/or firmware for storing data to be transmitted. The RF circuitry may include an antenna for enabling the RFID tag to transmit the data to an interrogating RFID read cell. Another example of a wireless identification tag is a transponder configured to generate a reply signal in response to electronic interrogation.

As referred to herein, the terms "wireless identification read cell" and "wireless identification reader" refer broadly to any electronic device capable of interrogating a wireless identification tag. For example, a wireless identification read cell may be an RFID reader or RFID read cell using backscatter communication techniques, capacitive or inductive coupling communications, or other various near-field communication techniques. The reader may, for example, include an antenna that emits radio waves to which the tag responds by sending back its data, such as an identifier of the tag and supplemental data. The reader and transponder communications may also include various analog or digital modulation techniques such as amplitude modulation, frequency modulation, amplitude shift keying, phase shift keying or frequency shift keying.

FIG. 1 illustrates a block diagram of an example wireless identification system 100 capable of managing multiple wireless identification tags in accordance with embodiments of the present invention. Referring to FIG. 1, the system 100 includes servers 102 communicatively connected to multiple RFID read cells 104 via one or more networks 106. The RFID read cells 104 may also be referred to as an RFID interrogator, an RFID reader/writer, an RFID read cell, or more generally as a wireless identification read cell, a wireless interrogator, or a wireless identification reader. Each RFID read cell 104 may include a processor 106, a transceiver 108, a memory 110, a power source 112, and an antenna 114. Further, each RFID read cell 104 is programmable and performs transmitting signals to and receiving signals from RFID tags 116. An RFID read cell 104 may use its antenna to communicate with RFID tags 116 that are within a communication range of the RFID read cell 104. Data downloaded from an RFID tag 116 may be stored in the memory 110, or transferred to one of the servers 102. Subsequently, this data may be further processed or communicated to another computing device. The RFID read cells may be arranged for covering an area such as a retail environment, or a portion of the environment such as a store shelf unit, isle, or entire store.

The servers 102 may provide backup to one another, increased performance, and may each include a wireless identification manager 118 configured to manage RFID read cells 104 for activating RFID tags 116 in accordance with embodiments of the present invention. In an example, tags may be polled continuously at a rate sufficient to handle a maximum number of tags expected to be on the move at any time. Further, the wireless identification manager 118 may determine identifiers for RFID tags 116 and may communicate the identifiers to RFID read cells 104 for distribution to, and reconfiguration of the RFID tags 116 in accordance with embodiments of the present invention. The manager 118 may include hardware, software, firmware, or combinations thereof configured to execute instructions for implementing functions according to embodiments of the present invention as disclosed herein. For example, the manager 118 may include one or more processors and memory. The processor(s) may be configured to execute computer program instructions residing on the memory for controlling system components and for implementing various aspects of embodiments of the present invention described herein.

The servers 102 and RFID read cells 104 may communicate via any suitable technique. For example, network(s) 106 may include a wireless access point (WAP) communicatively connected to the servers 102 and configured to wirelessly communicate with the RFID read cells 104. In another example, the network(s) 106 may include suitable wireless communication components such as, but not limited to, IEEE 802.3 Ethernet equipment, modems, or other local area network (LAN) equipment configured for communication with the servers 102 and RFID read cells 104. It is noted that only four RFID tags and two RFID read cells are shown in FIG. 1 for simplicity of illustration; however, a system in accordance with embodiments of the present invention may include any suitable number and configuration of RFID tags and RFID read cells.

Figure 2:
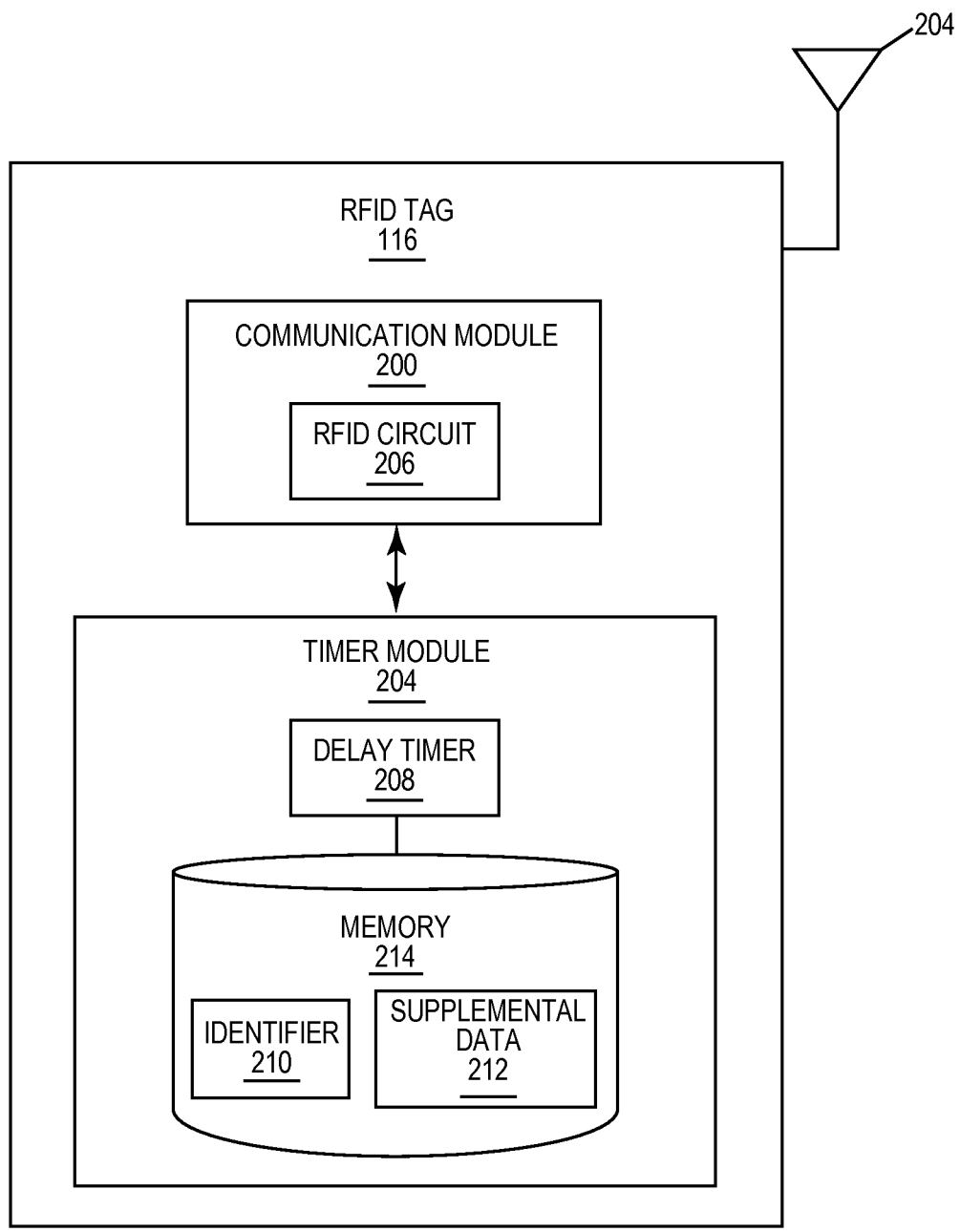
FIG. 2 is a block diagram of an example RFID tag according to embodiments of the present invention.

FIG. 2 illustrates a block diagram of an example RFID tag 116 according to embodiments of the present invention. Referring to FIG. 2, the RFID tag 116 may include a communication module 200 and a timer module 202. The communication module 200 may include an antenna 204 and an RFID circuit 206 configured to receive an instruction, such as an activation signal, from an RFID read cell, such as one of the RFID read cells 104 shown in FIG. 1. The antenna 204 may receive the instruction signal and may pass data contained within the instruction signal to the RFID circuit 206 for further processing.

The antenna 204 may be configured to receive an activation signal from an RFID read cell. Subsequently, the RFID circuit 206 may control the antenna 204 to wirelessly transmit data in response to receipt of the activation signal. For example, in response to receipt of the activation signal, the RFID circuit 206 may notify the timer module 204 of receipt of the activation signal. Receipt of the activation signal at the time module 204 may initiate a delay timer 208 and define multiple timeslots for communication of an identifier 210 and/or supplemental data 212. For example, one of the timeslots may be defined by all or a portion of the identifier 210. The timer module 204 may be configured to enable the communication module 200 to transmit the identifier 210 and/or other data, such as supplemental data 212, to the RFID read cell when the timeslot is reached. Thus, in this example, the identifier 210 of the RFID tag 116 defines a timeslot when all or a portion of the identifier 210 and supplemental data 212 is to be transmitted after receipt of an activation signal. The identifier 210 and supplemental data 212 may be stored in a memory 214. Supplemental data 212 may be any suitable data, such as a stored payload of the RFID tag 116.

The timer module 204 may be configured to receive another identifier, and to change the currently-stored identifier 210 with the received identifier. For example, the communication module 200 may receive the other identifier from an RFID read cell and communicate the received identifier to the timer module 204. The RFID read cell may receive instructions from a server for changing the identifier of the RFID tag 116 to this other identifier as disclosed in further detail herein. The timer module 204 may receive the other identifier and replace the stored identifier 210 with the other identifier. The other identifier may subsequently be used for defining a timeslot for transmission of the identifier and the supplemental data after receipt of an activation signal. This other identifier may be provided to the RFID tag such that the RFID tag sends its data at a timeslot different than other RFID tags.

In this example, the RFID tag 116 is passive and, therefore, does not include a battery for power. Passive RFID tags can be read if positioned within close enough proximity to an RFID read cell. Passive RFID tags rely on the RFID read cell as a power source. The RFID read cell may produce, for example, an electromagnetic field that induces a voltage in a coiled antenna of the RFID tag. The induced voltage in the coil causes a flow of current in the coiled antenna for powering the RFID tag. In another example, the RFID tag 116 may include a battery for powering components of the RFID tag 116 when in the presence of an RFID read cell.

Figure 3:
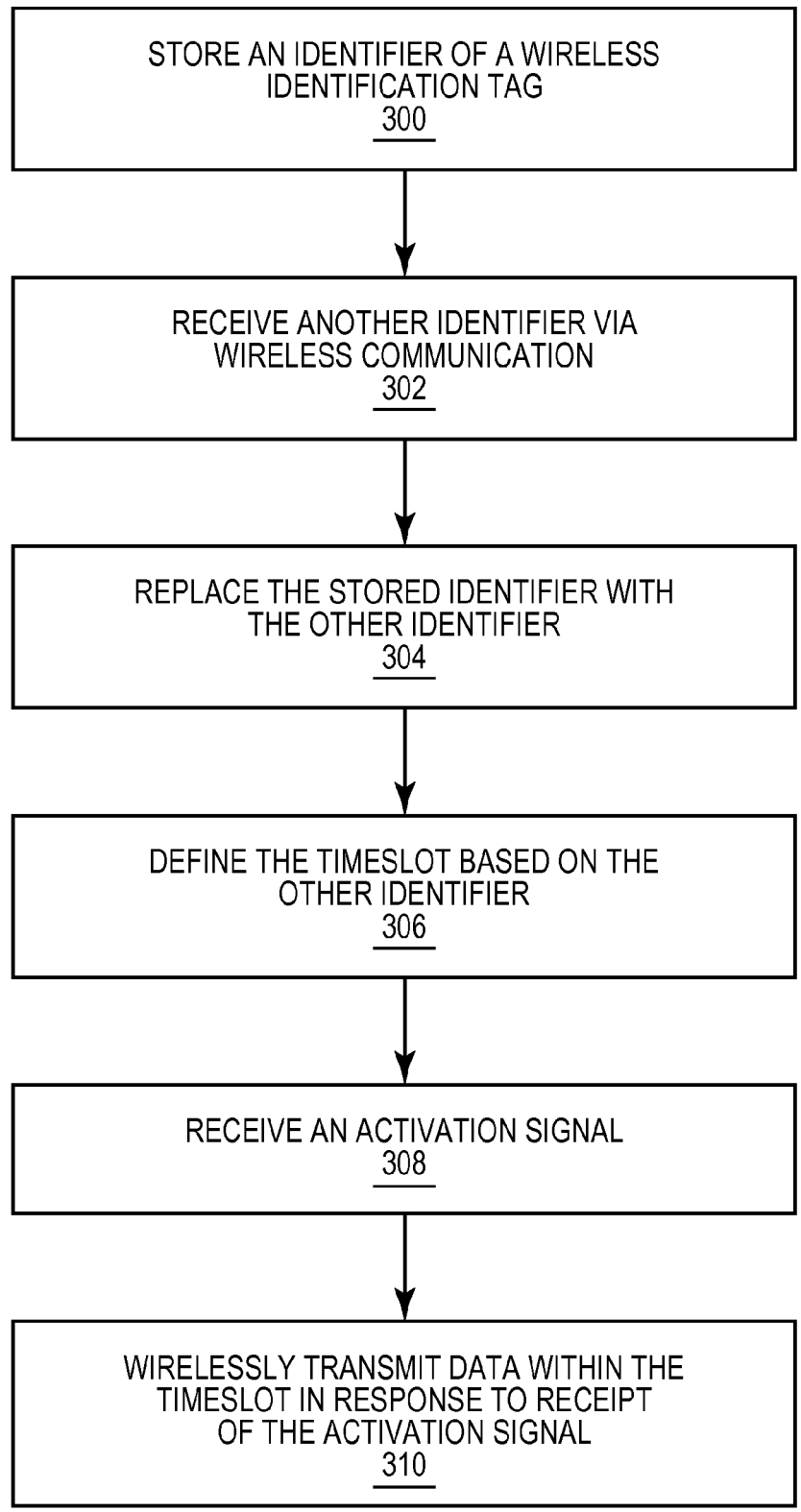
FIG. 3 is a flowchart of an example method for activation of a wireless identification tag and for transmission of data therefrom according to embodiments of the present invention.

In accordance with embodiments of the present invention, FIG. 3 illustrates a flowchart of an example method for activation of a wireless identification tag and for transmission of data therefrom. The method of FIG. 3 is described with respect to the example system 100 shown in FIG. 1 and the RFID tag 116 shown in FIG. 2, although the method may be implemented by any suitable system and wireless identification tag.

Referring to FIG. 3, the method includes storing 300 an identifier of a wireless identification tag. For example, the RFID tag 116 shown in FIG. 2 may store an identifier of an object, such as a product or item for sale in a retail environment, within the memory 214. The identifier stored in the memory 214 may be unique among one or more other identifiers stored in other RFID tags within an area serviced by one or more RFID read cells, such as the RFID read cells 104 shown in FIG. 1. In this way, the RFID tags may uniquely identify objects to which they are attached when the RFID tags are read. In accordance with embodiments of the present invention, the identifiers stored in the RFID read cells may be a sequence of contiguous identifiers for use in sequencing the RFID tags for transmission of their respective identifiers and payload, if any, upon activation by an RFID read cell.

Figure 4:
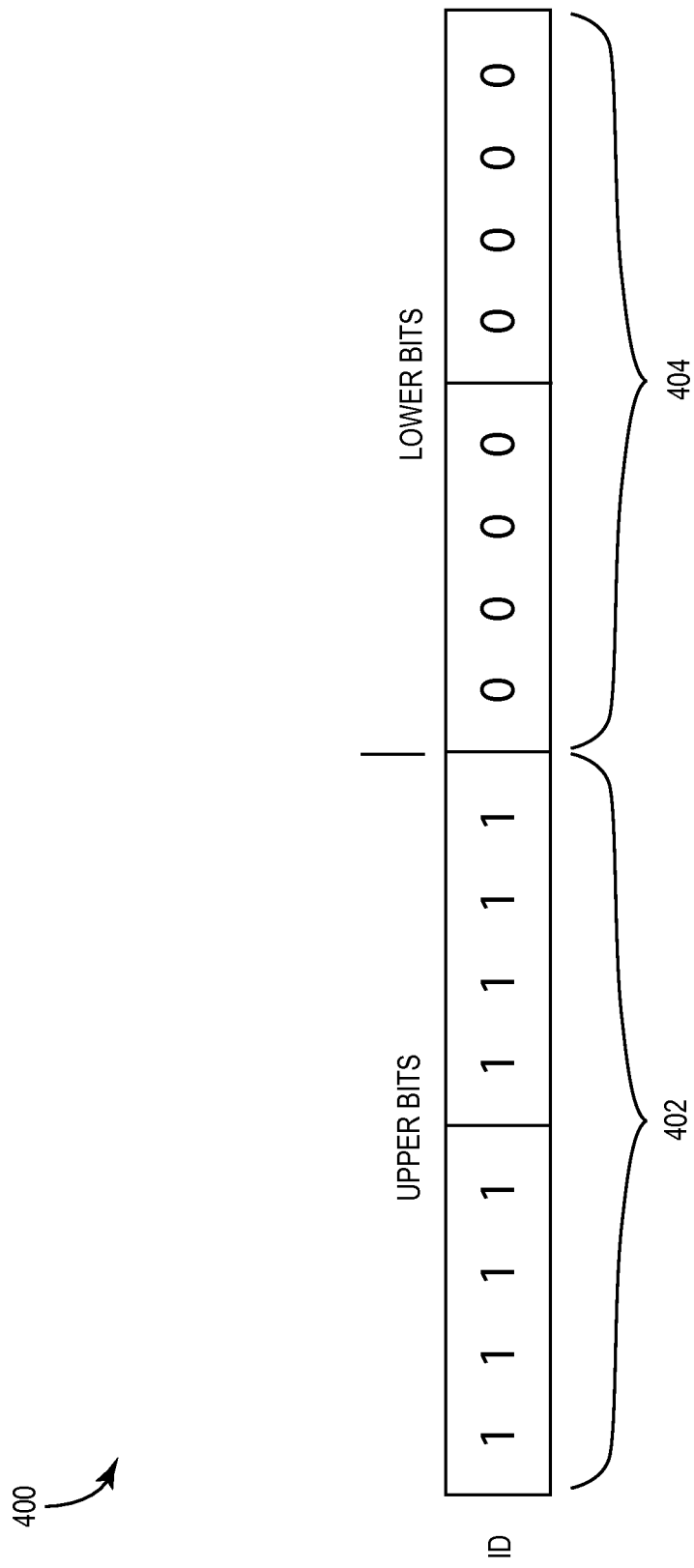
FIG. 4 is a representation of an example two-byte tag identification (ID) number for an RFID tag in accordance with embodiments of the present invention.

FIG. 4 illustrates a representation of an example two-byte tag identification (ID) number 400 for an RFID tag in accordance with embodiments of the present invention. The ID number 400 may be a unique identifier for an object, such as a product within a retail environment. Referring to FIG. 4, the ID number 400 may be segmented into a set of upper bits 402 and a set of lower bits 404. The ID number 400 may include a set of lower bits 404 for identifying a tag ID number per cell and programming a delay timer, such as the delay timer 208 shown in FIG. 2. Thus, in this example, a particular portion of the ID number 400 (i.e., the lower bits 404) is used for programming or setting the delay timer whereby a reduced number of lower bits allows for simpler delay timer with minimum number of bits and aids in resequencing ID numbers which may become out of sequence. The number of bits assigned to the lower set for programming the delay timer are configurable and relate to the maximum number of Tags required in a Read Cell, number of Read Cells per Row, number of Read Cells adjacent to each other, total number of Read Cells, among other physical and logical constrainings of a particular embodiment of this invention. Alternatively, all of an ID number may be used for programming the delay timer. Further, for example, a different portion of the ID number (e.g., the upper bits) may be used for programming the delay timer.

As the number of RFID tags that are to be uniquely identified increases, a greater portion of the ID number should be allocated for programming the delay timer. For example, if up to 256 tags are utilized, at least 8 bits of an ID number may be needed. In another example, if up to 65,536 tags are utilized, at least 16 bits of an ID number may be needed. In yet another example, if up to 16,777,216 tags are utilized, at least 24 bits of an ID number may be needed.

Referring now to FIG. 3, the method includes receiving 302 another identifier via wireless communication. For example, one of the servers 102 shown in FIG. 1 may assign a new identifier to one or more RFID tags 116. Particularly, for example, the wireless identification manager 118 in one of the servers 102 may control its network interface 120 to communicate one or more unique and contiguous identifiers to one of the RFID read cells 104 for assignment to one or more RFID tags 116 within a communication range of the recipient RFID read cell 104. A network interface 122 of the recipient RFID read cell 104 may receive the identifiers via the network 106. Subsequently, the RFID read cell 104 may assign the identifiers to the RFID tags 116 within its communication range. For example, the RFID read cell 104 may wirelessly communicate an identifier to a read tag 116 via its antenna 114. The RFID tag 116 may receive the identifier.

The method of FIG. 3 includes replacing 304 the stored identifier with the other identifier. For example, the timer module 204 of the RFID tag 116 shown in FIG. 3 may receive the identifier and may change the identifier 210 stored in the memory 214 based on the received identifier. The previously-stored identifier 210 may be entirely or at least partially replaced with the received identifier for use in defining a timeslot in accordance with embodiments of the present invention.

The method of FIG. 3 includes defining 306 a timeslot based on the other identifier. Continuing the aforementioned example, the received identifier may be represented by the ID number 400 shown in FIG. 4. In this example, the lower bits 404 of the ID number 400 may be used for defining a timeslot for transmission of the identifier and the supplemental data 212 stored in the memory 214 of the RFID tag 116. The lower bits 404 may be input into a delay timer 208 for use in selecting a timeslot among multiple timeslots defined by the delay timer 208. The delay timer 208 may define the multiple timeslots in response to activation of the RFID tag 116 by an RFID read cell. In an example, the timeslots may be sequentially numbered and selectable by the number identified by the lower bits 404. In other words, the timeslot matching the number in the lower bits 404 may be selected timeslot.

Figure 5:
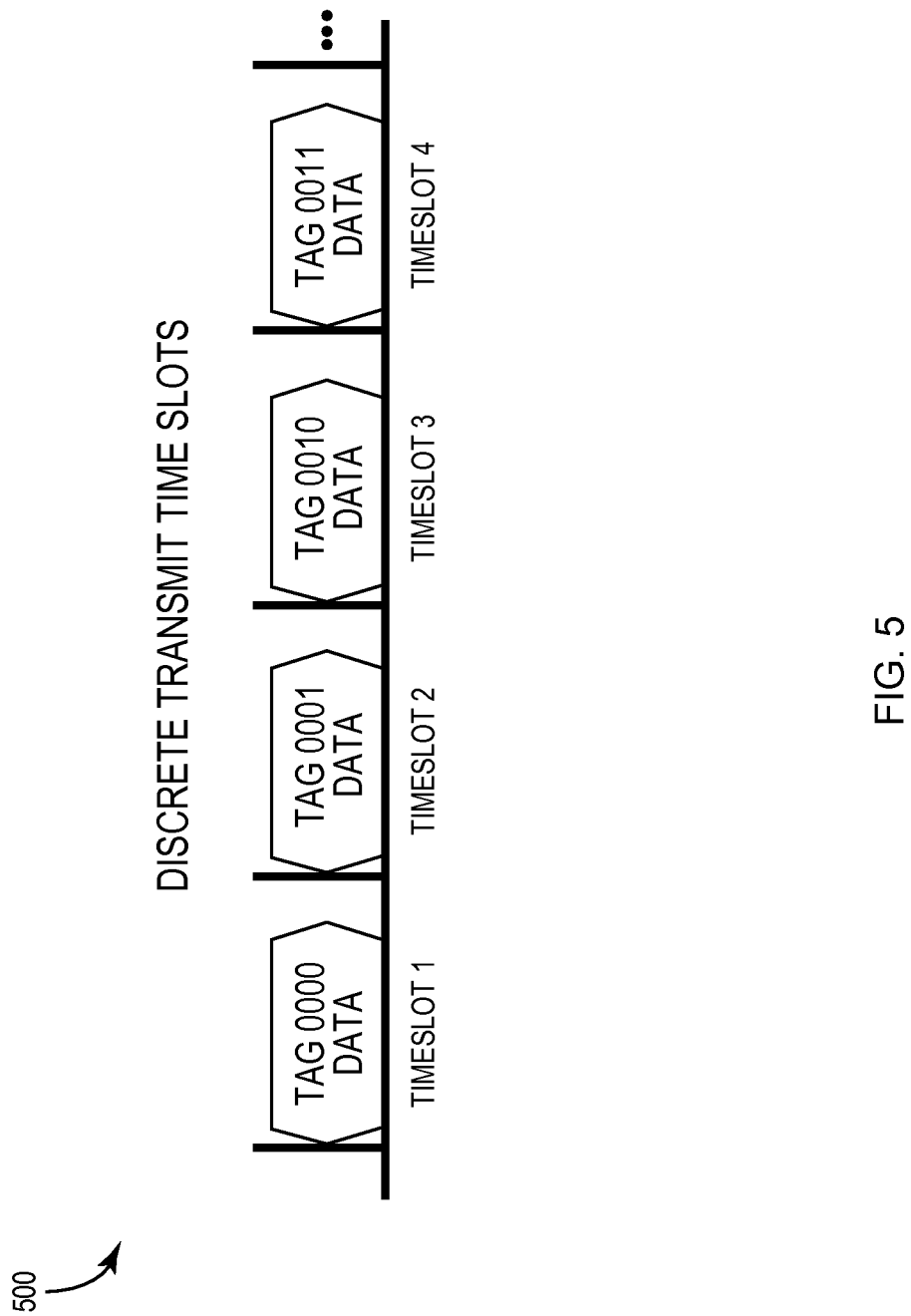
FIG. 5 is an example sequence of transmit timeslots defined by RFID tags in accordance with embodiments of the present invention.

FIG. 5 illustrates an example sequence of transmit timeslots 500 defined by RFID tags in accordance with embodiments of the present invention. Referring to FIG. 5, data from a particular RFID tag may be communicated within one of many uniquely numbered timeslots. For example, data within an RFID tag having identifier 0000 may be communicated within timeslot 1. Subsequently, data within an RFID tag having identifier 0001 may be communicated within timeslot 2, followed by communication by an RFID tag having identifier 0010 within timeslot 3, and subsequently an RFID tag having identifier 0011 within timeslot 4. Timer modules in each of the RFID tags may define the timeslots in response to receipt of an activation signal from an RFID read cell. An RFID tag may communicate its data (e.g., identifier and/or supplemental data) to the RFID read cell in response to its timer reaching the timeslot matching all or a portion of its identifier number. In this way, the RFID tags are each transmitting its data in a discrete transmit timeslot such that collisions among the RFID tags are avoided.

Referring now to FIG. 3, the method includes receiving 308 an activation signal. For example, an RFID read cell, such as the RFID read cell 104 shown in FIG. 1, may communicate an activation signal to the RFID tag 116. Upon activation of the RFID tag 116, the delay timer 208 may initiate its timer for sequencing through timeslots.

The method of FIG. 3 includes wirelessly transmitting 310 data within the timeslot in response to receipt of the activation signal. When the timer reaches the timeslot identified by the lower bits 404, the timer module 204 communicates the identifier 210 and/or supplemental data 212 to the RFID read cell that sent the activation signal. The timer module 204 may control the communication module 200 to send the identifier 210 and/or supplemental data 212 via wireless communication and within the identified timeslot.

Figure 6:
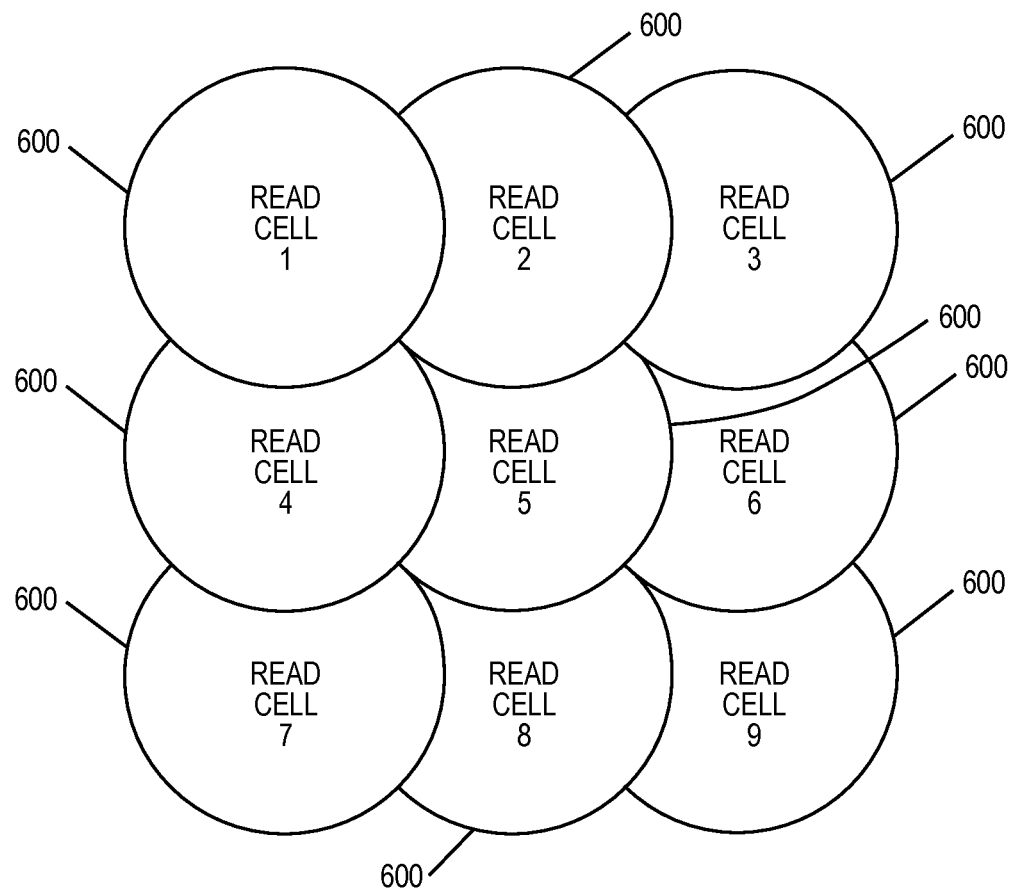
FIG. 6 is a top plan view of example communication ranges of multiple wireless identification read cells in accordance with embodiments of the present invention.

FIG. 6 illustrates a top plan view of example communication ranges 600 of multiple wireless identification read cells in accordance with embodiments of the present invention. Referring to FIG. 6, the communication ranges 600 are circular in shape and each overlap with the communication range of adjacent read cells as depicted, in order to prevent gaps in communication range for multiple circular read cells. As a result, the communication range 600 of read cell 1 overlaps with the communication ranges 600 of read cells 2 and 4. It is also noted that the read cells in this example are arranged in a matrix, and the communication ranges 600 of read cells of a row (e.g., read cells 1, 2, and 3) overlap with an adjacent row (e.g., read cells 4, 5, and 6). In alternative examples, read cells may be of any suitable number and may be arranged in any suitable configuration such that communication ranges of one or more of the read cells overlap with one or more other read cells. When a wireless identification tag, such as an RFID tag, is positioned within an area where communication ranges of read cells overlap, the tag may be activated by both read cells. In contrast, when a wireless identification tag is positioned within a communication range of only a single read cell, the tag may be activated only by that read cell. Read cells may be positioned to overlap in this way to assure that the entirely or most of an area is provided coverage for tag activation.

Figure 7:
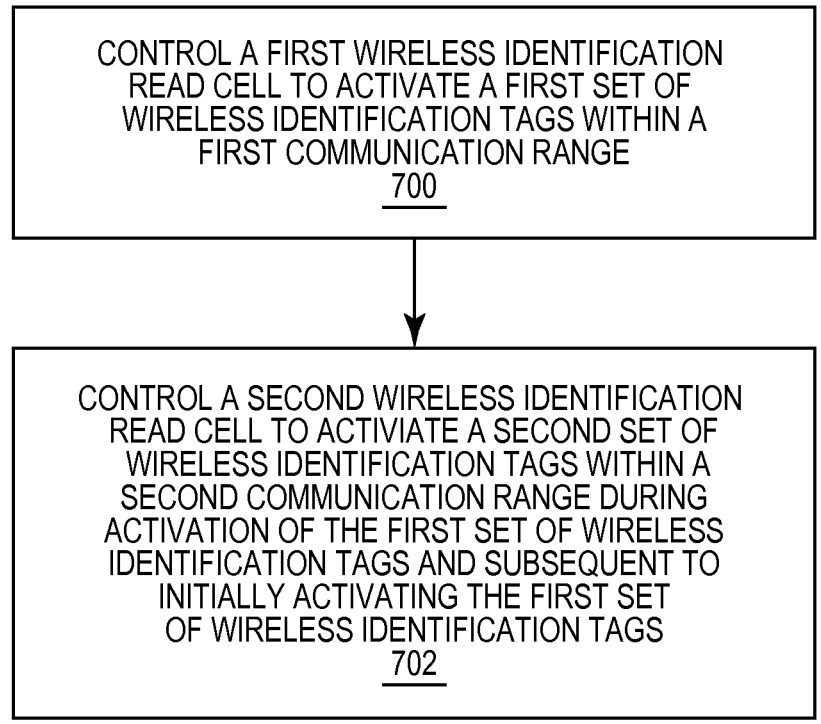
FIG. 7 illustrates a flowchart of an example method for activation of multiple wireless identification tags by multiple wireless identification read cells in accordance with embodiments of the present invention.

In accordance with embodiments of the present invention, the read cells of FIG. 6 activate wireless identification tags at different times. The read cells may activate their respective tags in a rolling manner such that successive read cells activate their respective tags before the previous read cell deactivates its respective tags. FIG. 7 illustrates a flowchart of an example method for activation of multiple wireless identification tags by multiple, wireless identification read cells. The method of FIG. 7 is described with respect to the example read cells described with respect to FIG. 6 and the RFID read cells 104 and RFID tags 116 shown in FIG. 1, although the method may be implemented by any suitable system, read cells, or wireless identification tags. The control steps of FIG. 7 may be implemented, for example, by the manager 118 of one of the servers 102.

Figure 8:
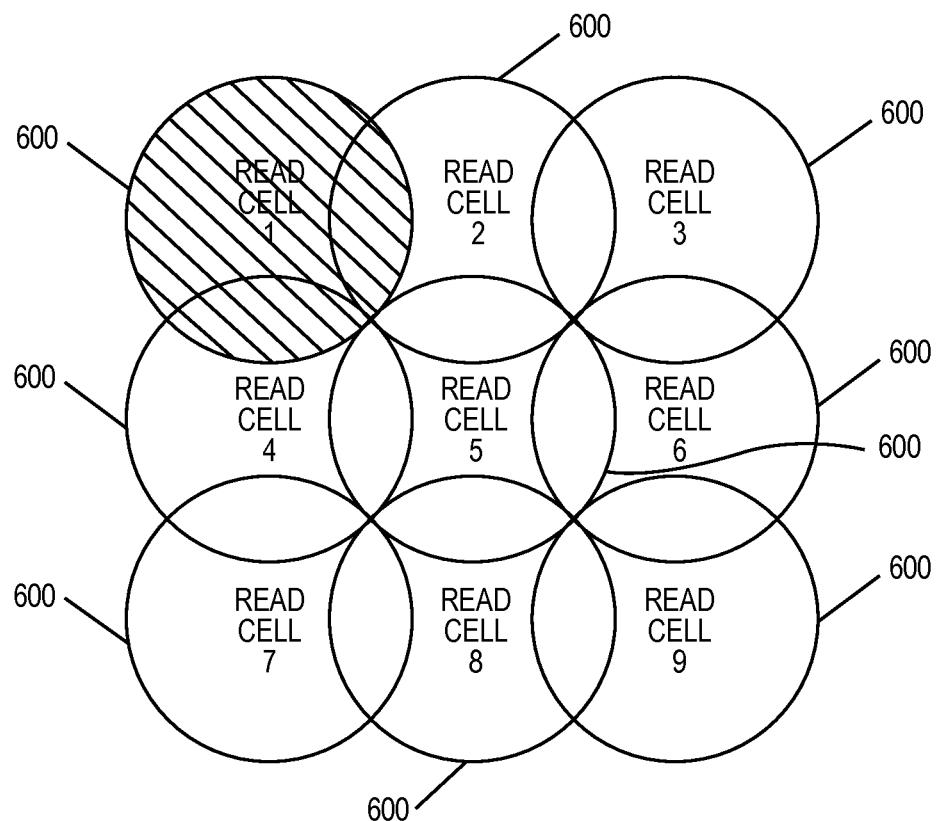
FIG. 8 is a top plan view of the communication ranges shown in FIG. 6 wherein the cross-hatching of the communication range area of read cell 1 indicates that the tags within this area have been activated in accordance with embodiments of the present invention.

Referring to FIG. 7, the method includes controlling 700 a first wireless identification read cell to activate a first set of wireless identification tags within a first communication range. For example, one of the servers 102 shown in FIG. 1 may control RFID read cell 104 to activate RFID tags 116 within its communication range. In another example, FIG. 8 illustrates a top plan view of the communication ranges 600 wherein the cross-hatched portion of the communication range area of read cell 1 indicates that the tags within this area have been activated. It is noted that by activating read cell 1, tags within communication ranges 600 of read cells 2 and 4 are also now activated.

Figure 9:
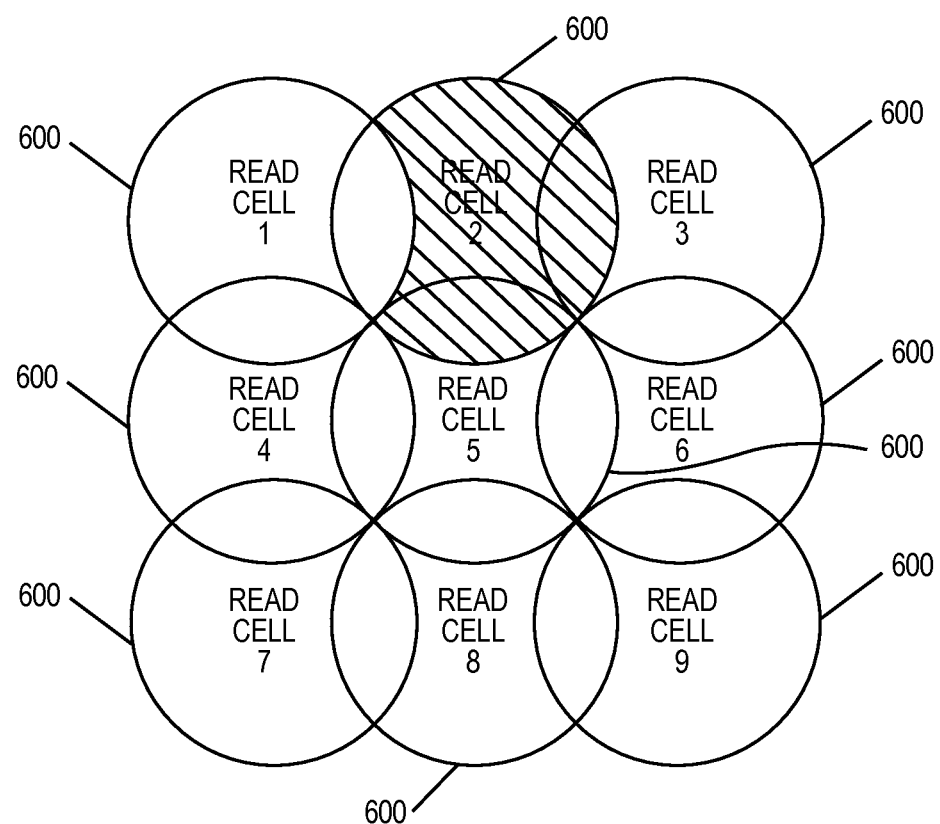
FIG. 9 is a top plan view of the communication ranges shown in FIG. 6 wherein the cross-hatching of a portion of the communication range area of read cell 2 indicates a location of the tags within this area have been newly activated after power on by read cell 2 in accordance with embodiments of the present invention.

The method of FIG. 7 includes controlling 702 a second wireless identification read cell to activate a second set of wireless identification tags within a second communication range during activation of the first set of wireless identification tags and subsequent to initially activating the first set of wireless identification tags, wherein the first communication range overlaps with the second communication range. Continuing the above example of FIG. 8, read cell 2 may be controlled to activate read cells while read cell 1 is controlled to maintain activation of its read cells. For example, the antenna of read cell 1 may be kept powered on while the antenna of read cell 2 is powered on. As a result, the tags within the overlapping communication range of read cells 1 and 2 will be kept in an enumerated state after being read by read cell 1 so that these tags do not transmit a second time when read cell 2 activates tags. FIG. 9 illustrates a top plan view of the communication ranges 600 wherein the cross-hatching of a portion of the communication range area of read cell 2 indicates a location of the tags within this area have been newly activated after power on by read cell 2. It is noted that by activating read cell 2 while read cell 1 is powered on, tags within the cross-hatched portion are the only tags that are newly activated while others in the communication range 600 of read cell 2 were activated when read cell 1 powered on.

Figure 10:
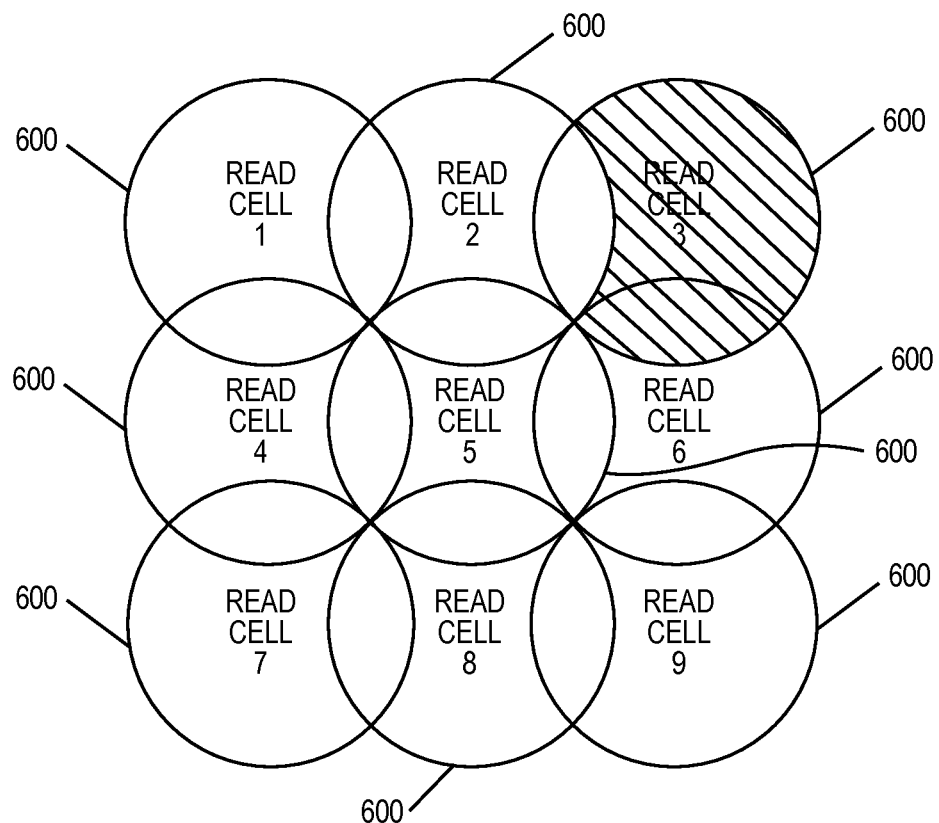
FIG. 10 is a top plan view of the communication range shown in FIG. 6 wherein the cross-hatching of a portion of the communication range area of read cell 3 indicates a location of the tags within this area that have been newly activated after power on by read cell 3 in accordance with embodiments of the present invention.

Subsequent to power on of read cell 2 in the example of FIG. 9 and the reading of tags within the cross-hatched area in FIG. 9, read cell 3 may be controlled to activate tags while read cell 2 remains powered on. As a result, the tags in the cross-hatched area shown in FIG. 9 do not collide with those in the communication area of read cell 3. FIG. 10 illustrates a top plan view of the communication range 600 wherein the cross-hatching of a portion of the communication range area of read cell 3 indicates a location of the tags within this area that have been newly activated after power on by read cell 3.

Figure 11:
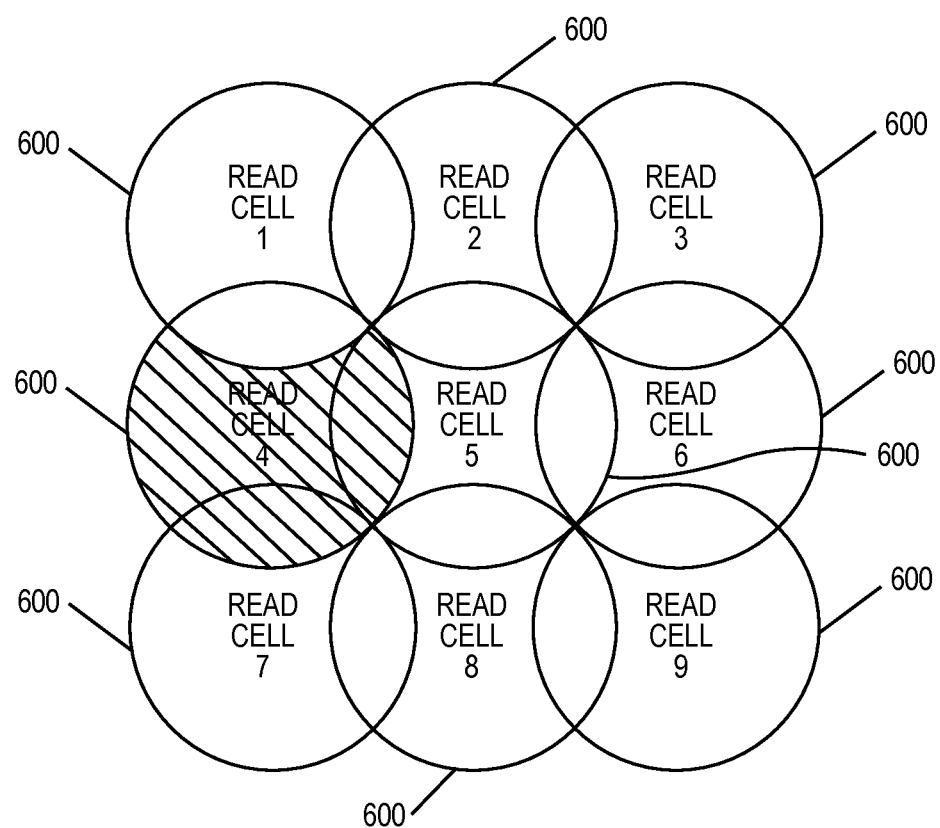
FIG. 11 is a top plan view of the communication range 600 wherein the cross-hatching of a portion of the communication range area of read cell 4 indicates a location of the tags within this area that have been newly activated after power on by read cell 4 in accordance with embodiments of the present invention.

Read cells 1, 2, and 3 may be considered to be arranged in a first row in the matrix of read cells shown in FIG. 6. Subsequent to activation of read cells 1, 2, and 3 in this first row, read cells 1, 2, and 3 may be controlled to remain powered on while read cells in a second row (i.e., read cells 4, 5, and 6) that overlap with the first row are activated. The read cells 4, 5, and 6 may activate their respective tags in the same manner as read cells 1, 2, and 3, while read cells 1, 2, and 3 remain powered on. As a result, the tags in the overlapping areas of the first and second rows do not collide with tags activated by powering on read cells 4, 5, and 6. FIG. 11 illustrates a top plan view of the communication range 600 wherein the cross-hatched portion of the communication range area of read cell 4 indicates a location of the tags within this area that have been newly activated after power on by read cell 4.

Subsequent to activating all the read cells in the second row, the read cells in the first row can become inactive since all of the tags in the first row have been read, including tags that overlap with the second row of read cells. Thus, the tags in the first row are controlled to be deactivated and unpowered after data is received from the second row. Subsequently, read cells in the second row can remain powered on while read cells 7, 8, and 9 in the third row are sequentially activated. Once all the tags in row 3, the final row, have been read RFID tag enumeration has completed and all remaining read cells may be powered down. When rows of cells are arranged as in the example shown in FIGS. 6 and 8-11, at most two rows remain powered at any time as the rows of read cells move as a wave from the first row to the last row.

In accordance with embodiments of the present invention, a server such as server 102 can control multiple wireless identification read cells, such as RFID read cells 104, to assign and re-assign identifiers to wireless identification tags, such as RFID tags 116. The server may control assignment of identifiers to tags such that the identifiers are in contiguous sequence for avoiding tag collisions. In an example, tags within a communication range of a read cell may be assigned identifiers that are unique to others within the read cell and contiguous in sequence. As disclosed herein, an assigned identifier may be stored in a tag for use in timing transmission of data from the tag after activation within a read cell. For example, the assigned identifier may define a unique timeslot for transmission of the data. The identifiers assigned to the tags can be unique and in contiguous sequence such that when two or more of the tags are activated, each tag transmit its data in a timeslot different than the other tags.

In accordance with embodiments of the present invention, a unique and contiguous identifier may be assigned to each tag that enters a communication range of one or more read cells. Identifiers of tags within the communication range may be re-sequenced when tags are moved into or out of the communication range. Further, tags within a communication range of a read cell may be order in sequence. Identifiers of tags within a communication range of a read cell may be exchanged with identifiers of tags within a communication range of another read cell to ensure that every tag within a particular read cell has an identifier that is in sequence.

Figure 12:
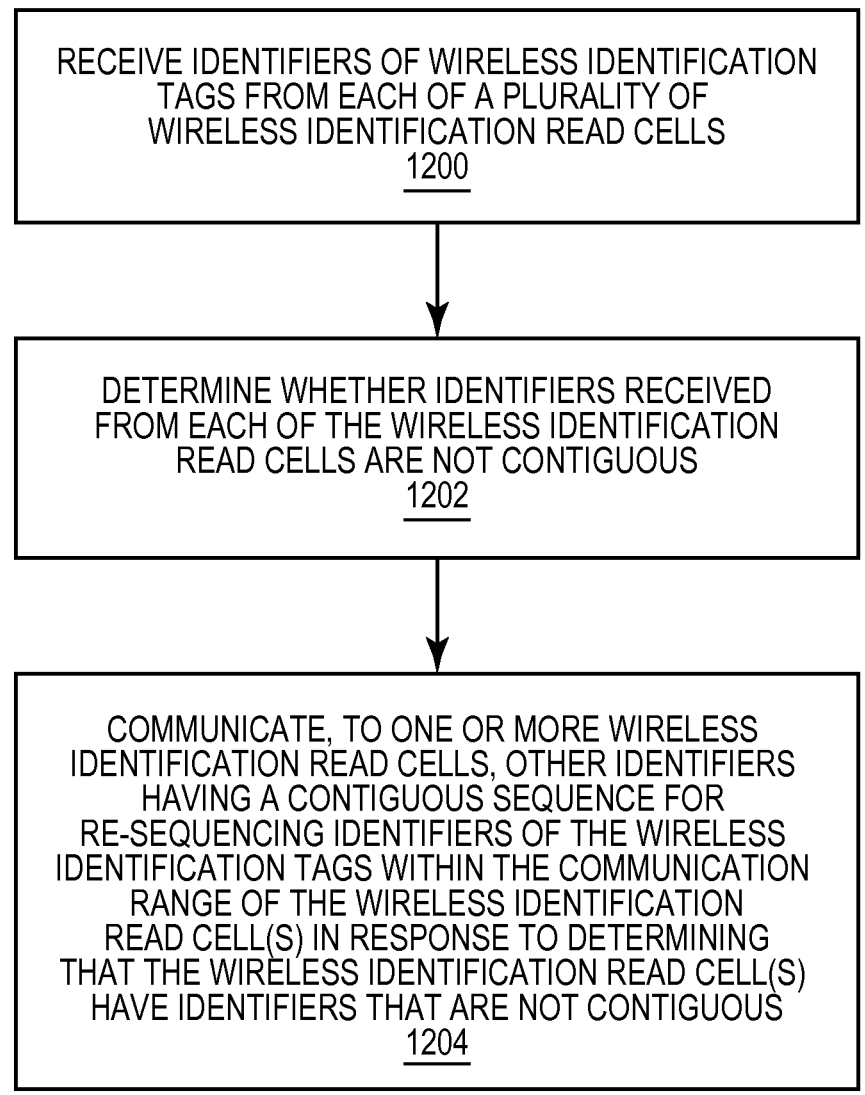
FIG. 12 is a flowchart of an example method for re-sequencing identifiers of wireless identification tags within a communication range of multiple, wireless identification read cells in accordance within embodiments of the present invention.

Tags may be between different read cells such that two or more of the tag identifiers become non-contiguous. In such an instance, the tag identifiers may be re-sequenced or re-assigned such that the identifiers of tags within the communication range of the read cell are unique and in contiguous sequence. FIG. 12 illustrates a flowchart of an example method for re-sequencing identifiers of wireless identification tags within a communication range of multiple, wireless identification read cells in accordance within embodiments of the present invention. The method of FIG. 12 is described with respect to the example system 100 shown in FIG. 1, although the method may be implemented by any suitable system.

Referring to FIG. 12, the method includes receiving 1200 identifiers of wireless identification tags from each of a plurality of wireless identification read cells. For example, the wireless identification manager 118 of one of the servers 102 shown in FIG. 1 may control the read cells 104 to read identifiers of their respective RFID tags 116. The wireless identification manager 118 may communicate messages to the read cells 104 via the network 106 to request the RFID tag identifiers. In response to receipt of the messages, the read cells 104 may each activate the read tags to obtain the identifiers. The read cells 104 may subsequently communicate their collected identifiers to the server 102 via the network 106.

The method of FIG. 12 includes determining 1202 whether identifiers received from each of the wireless identification read cells are not contiguous. Continuing the aforementioned example, the wireless identification manager 118 may determine whether the identifiers received from the read cells 104 are not contiguous. For example, the wireless identification manager 118 may determine whether identifiers received from each of the read cells 104 are not contiguous. If the identifiers from a read cell are not contiguous, identifier re-sequencing may be implemented as described in further detail hereinbelow. If the identifiers are contiguous, the process may end because re-sequencing is not needed for tags of the read cell.

The method of FIG. 12 includes communicating 1204, to one or more wireless identification read cells, other identifiers having a contiguous sequence for re-sequencing identifiers of the wireless identification tags within the communication range of the wireless identification read cell(s) in response to determining that the wireless identification read cell(s) have identifiers that are not contiguous. Continuing the aforementioned example, the wireless identification manager 118 may re-sequence identifiers of tags within a communication range of a read cell such that the identifiers are contiguous. In an example, the identifiers may be numbers that are re-sequenced. The manager 118 may subsequently communicate the identifiers to the RFID read cell 104 via the network 106 for assignment to its respective RFID tags 116. The recipient RFID read cell 104 may subsequently assign the re-sequenced identifiers to the RFID tags 116 within its communication range. Each RFID tag 116 may subsequently replace its previously-stored identifier with the new identifier for use in timing transmission of data from the tag after activation in accordance with embodiments of the present invention.

In an example, when identifiers of multiple RFID tags are read, one or more identifiers may be missing from a contiguous sequence of identifiers for tags. A missing identifier may result when a tag with the identifier moves out of a communication range of a read cell or when a read cell does not otherwise receive the identifier from the tag. The missing identifier within the contiguous sequence may be moved across read cells one at a time, rather than re-sequencing identifiers within an entire read cell. In this way, the number of identifier writes and time for re-sequencing can be minimized or reduced.

As described herein, identifiers of tags within a single read cell may be contiguous or re-sequenced to be contiguous in accordance with embodiments of the present invention. In an example, identifiers may be reserved for re-ordering or re-sequencing purposes. For example, the wireless identification manager 118 of one of the servers 102 shown in FIG. 1 may track within a memory 124 a listing of identifiers associated with each RFID read cell 104. In this example, identifiers 1-50 may identify tags 116 within one of the RFID read cells 104, and identifiers 55-100 may identify tags 116 within the other RFID read cell 104. Data stored in the memory 124 may associate the identifiers with their RFID read cell 104. Identifiers 51-54 are available if needed for re-sequencing the identifiers associated within one of the RFID read cells 104. For example, if a tag enters a communication range of one of the RFID read cells 104, one of the identifiers 51-54 is available for the tag so that all the other tags do not need to be re-sequenced.

In another example, one or more tags may leave a communication range of one of the RFID read cells 104. In this example, identifiers of tags remaining in the communication range may be changed to be shifted until the identifiers of tags within the communication range of the RFID read cell 104 are contiguous. It is noted that tags moved from one RFID read cell to another may involve the same process as adding a tag to one RFID read cell and removing a tag from another RFID read cell as described herein.

In another example, identifiers of tags within a row of read cells may be contiguous or substantially contiguous with only a few missing identifiers. Referring to FIG. 6, for example, identifiers of tags within the communication ranges 600 of read cells 1, 2, and 3 may be contiguous or substantially contiguous. In an example, identifiers may be reserved for re-ordering or re-sequencing purposes between rows, such as between the row including read cells 1, 2, and 3 and the row including read cells 4, 5, and 6 shown in FIG. 6. As a result of maintaining reserved identifiers, full re-ordering or re-sequencing in multiple read cells is limited to be needed at most across one row of read cells under the assumption that the number of identifiers added is less than a full read cell's number of identifiers. In an example of a large number of tags being added to a read cell, identifiers may be shifted up to accommodate the number of new identifiers in the read cell. In another example, each read cell may be associated with a number of available identifiers above its contiguous range of identifiers for use in re-sequencing. Identifiers may be shifted up to each successive read cell, such as from read cell 1 to read cell 2 shown in FIG. 6. As needed, the identifiers reserved between successive read cell rows may be used.

In a scenario in which the number of identifiers to be added or deleted exceeds the available identifiers between rows, a server, such as server 102 shown in FIG. 1, may operate in a maintenance mode for re-sequencing all identifiers in all rows to accommodate the large number of identifiers to be added or deleted. In an example, the server may suspend identifier re-sequencing during times when a large number of identifiers are on the move. The maintenance mode may end after the identifiers have completed movement. Within the maintenance mode, all tags in all rows may be re-sequenced. In addition in the maintenance mode, reserve identifiers that are not currently assigned to tags may be made available between rows.

As discussed herein, tag identifiers may define unique timeslots for transmission of data from the tags. In some cases when timeslots are used as disclosed herein, collisions between tags may occur, and such collisions may be handled using any suitable technique presently used in the art or other methods of anti collision.

A wireless identification manager, such as the wireless identification manager 118 residing on the server 102, may store within the memory 124 a list of unique identifiers that have been assigned to RFID tags, such as the RFID tags 116. In addition, the memory 124 may store addresses of the read cells 104 and identification of a physical location of each read cell 104. The manager 118 may also assign identifiers to tags that enter an area, and may reclaim identifiers when tags leave an area. For example, an item with a tag attached thereto may leave an area when the item is purchased. In another example, an item with a tag may enter a store when the store is stocked with the item. As items enter or leave the area, the manager 118 may assign and re-sequence identifiers as disclosed herein.

Further, the manager 118 may store in memory 124 shelf or other store space identifiers for association with tag identifiers where items with the tags have preferred locations on a particular shelf or store space. The item may be quickly located and returned to its proper place by store personnel by use of the store space identifier and tag identifier. Such information may be suitably presented to the store personnel by use of one of the servers 102 or other computing device having access to the information.

The manager 118 may manage conflicts when tags are within a communication range of multiple read cells. Initially, the tag may be assigned to the read cell having the lowest address or identifier.

In another example, the manager 118 may generate an alert when a tag is missing. For example, an alert may be generated when an identifier for the tag is not reported after activation of all read cells. This situation may occur when a tag leaves a communication range of a read cell and does not enter a communication range of another read cell. Such an alert may indicate that the item with the tag is lost in the store or possibly theft of the item.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
    a first read cell associated with a first set of contiguous identifiers and a reserve set of contiguous identifiers;
    a second read cell associated with a second set of contiguous identifiers, the second set of contiguous identifiers being different from the first set of contiguous identifiers, and the reserve set of contiguous identifiers, wherein the first set, reserve set, and second set of contiguous identifiers together complete a substantially contiguous sequence of identifiers;
    a plurality of wireless identification tags, each wireless identification tag of the plurality of wireless identification tags comprising:
        a communication module configured to wirelessly transmit data in response to receipt of an instruction; and
        a timer module configured to:

communicate the instruction to the communication module for transmission of the data within a timeslot based on a stored first identifier of the wireless identification tag;
receive a second identifier from among the reserve set of contiguous identifiers; and
change the stored identifier based on the second identifier.

2. The system of claim 1, wherein the communication module and the timer module are components of one of a radio frequency identification (RFID) tag and a transponder.

3. The system of claim 1, wherein the second identifier uniquely identifies each wireless identification tag of the plurality of wireless identification tags from among the plurality of wireless identification tags, and
wherein the timer module is configured to select the timeslot from among a plurality of timeslots based on at least a portion of the second identifier.

4. The system of claim 1, wherein the communication module is configured to:
wirelessly receive the second identifier; and
communicate the second identifier to the timer module.

5. The system of claim 4, wherein the timer module is configured to:
receive the second identifier from the communication module; and
replace the first identifier in memory with the second identifier.

6. The system of claim 1, wherein the communication module is configured to receive an activation signal over a wireless connection, and
wherein the timer module is configured to:
initiate a timer and define a plurality of timeslots in response to receipt of the activation signal, wherein the timeslot is one of the plurality of timeslots; and
communicate the data in response to the timer reaching the timeslot.

7. The system of claim 6, wherein the communication module includes an antenna and a radio frequency identification (RFID) circuit configured to:
receive the activation signal from an RFID read cell; and
communicate the data to the RFID read cell in response to the timer reaching the timeslot.

8. A method comprising:
at a system comprising a first read cell, a second read cell, and a plurality of wireless identification tags:
storing, at the first read cell, a first set of contiguous identifiers and a reserve set of contiguous identifiers;
storing, at the second read cell, a second set of contiguous identifiers, the second set of contiguous identifiers being different from the first set of contiguous identifiers, and the reserve set of contiguous identifiers, wherein the first set, reserve set, and second set of contiguous identifiers together complete a substantially contiguous sequence of identifiers;
storing, at a wireless identification tag of the plurality of wireless identification tags, a first identifier of the wireless identification tag;
receiving, at the wireless identification tag of the plurality of wireless identification tags, a second identifier via wireless communication from among the reserve set of contiguous identifiers;
replacing, at the wireless identification tag of the plurality of wireless identification tags, the first identifier with the second identifier;
defining, at the wireless identification tag of the plurality of wireless identification tags, a timeslot based on the second identifier;
receiving, at the wireless identification tag of the plurality of wireless identification tags, an activation signal; and
in response to receipt of the activation signal, wirelessly transmitting, at the wireless identification tag of the plurality of wireless identification tags, data within the timeslot.

9. The method of claim 8, wherein the wireless identification tag of the plurality of wireless identification tags is one of a radio frequency identification (RFID) tag and a transponder.

10. The method of claim 8, wherein the second identifier uniquely identifies the wireless identification tag from among the plurality of wireless identification tags, and
wherein defining the timeslot comprises selecting the timeslot from among a plurality of timeslots based on at least a portion of the second identifier.

11. The method of claim 8, wherein replacing the first identifier comprises replacing the first identifier in a memory of the wireless identification tag of the plurality of wireless identification tags with the second identifier.

12. The method of claim 8, wherein receiving the activation signal comprises receiving the activation signal over a wireless connection,
wherein the method further comprises initiating, at the wireless identification tag of the plurality of wireless identification tags, a timer of the wireless identification tag and defining a plurality of timeslots in response to receipt of the activation signal, wherein the timeslot is one of the plurality of timeslots, and
wherein wirelessly transmitting the data comprises communicating the data in response to the timer reaching the timeslot.

13. The method of claim 12, wherein receiving the activation signal comprises receiving, at the wireless identification tag of the plurality of wireless identification tags, the activation signal from an radio frequency identification (RFID) read cell, and
wherein wirelessly transmitting the data comprises communicating the data to the RFID read cell in response to the timer reaching the timeslot.

14. A computer program product for coordinating transmission of data from a wireless identification tag of a plurality of wireless identification tags, said computer program product comprising:
a first non-transitory computer readable storage medium having a first computer readable program code embodied therewith, the first computer readable program code comprising:
computer readable program code configured to store, at a first read cell, a first set of contiguous identifiers and a reserve set of contiguous identifiers;
computer readable program code configured to store, at a second read cell, a second set of contiguous identifiers, the second set of contiguous identifiers being different from the first set of contiguous identifiers, and the reserve set of contiguous identifiers, wherein the first set, reserve set, and second set of contiguous identifiers together complete a substantially contiguous sequence of identifiers;
a second non-transitory computer readable storage medium having a second computer readable program code embodied therewith, the second computer readable program code comprising:

computer readable program code configured to store, at the wireless identification tag of the plurality of wireless identification tags, a first identifier of the wireless identification tag;

computer readable program code configured to receive, at the wireless identification tag of the plurality of wireless identification tags, a second identifier via wireless communication from the reserve set of contiguous identifiers;

computer readable program code configured to replace, at the wireless identification tag of the plurality of wireless identification tags, the first identifier with the second identifier;

computer readable program code configured to define, at the wireless identification tag of the plurality of wireless identification tags, a timeslot based on the second identifier;

computer readable program code configured to receive, at the wireless identification tag of the plurality of wireless identification tags, an activation signal; and computer readable program code configured to control, at the wireless identification tag of the plurality of wireless identification tags, wireless transmission of data within the timeslot in response to receipt of the activation signal.

15. The computer program product of claim 14, further comprising computer readable program code configured to select, at the wireless identification tag of the plurality of wireless identification tags, the timeslot from among a plurality of timeslots based on at least a portion of the second identifier.

16. The computer program product of claim 14, further comprising computer readable program code configured to replace, at the wireless identification tag of the plurality of wireless identification tags, the first identifier in a memory of the wireless identification tag with the second identifier.

17. The computer program product of claim 14, further comprising:

computer readable program code configured to initiate, at the wireless identification tag of the plurality of wireless identification tags, a timer of the wireless identification tag and define a plurality of timeslots in response to receipt of the activation signal, wherein the timeslot is one of the plurality of timeslots; and computer readable program code configured to communicate, at the wireless identification tag of the plurality of wireless identification tags, the data in response to the timer reaching the timeslot.

* * * * *